United States Patent
Hindanov et al.

(10) Patent No.: US 10,673,971 B1
(45) Date of Patent: Jun. 2, 2020

(54) CROSS-PARTITION MESSAGING USING DISTRIBUTED QUEUES

(71) Applicant: Amazon Technologies, Inc., Seattle, WA (US)

(72) Inventors: Timur Melsovich Hindanov, Bainbridge Island, WA (US); Jonathan Joseph Bryak, Brier, WA (US)

(73) Assignee: Amazon Technologies, Inc., Seattle, WA (US)

( * ) Notice: Subject to any disclaimer, the term of this patent is extended or adjusted under 35 U.S.C. 154(b) by 464 days.

(21) Appl. No.: 14/742,179

(22) Filed: Jun. 17, 2015

(51) Int. Cl.
   *G06F 15/16* (2006.01)
   *H04L 29/08* (2006.01)
   *H04L 12/861* (2013.01)

(52) U.S. Cl.
   CPC .............. *H04L 67/28* (2013.01); *H04L 49/90* (2013.01)

(58) Field of Classification Search
   CPC .......... G06F 17/301; G06F 9/505; G06F 8/34; G06F 9/466; G06F 11/1443; H04L 29/06; H04L 51/26; H04L 67/02; H04L 63/0227; H04L 47/10; H04L 51/14; H04L 67/2819; H04L 67/2823; H04L 12/4641
   See application file for complete search history.

(56) References Cited

U.S. PATENT DOCUMENTS

| | | | | |
|---|---|---|---|---|
| 6,279,041 B1 * | 8/2001 | Baber | ...................... | H04L 47/10 370/235 |
| 6,434,596 B1 * | 8/2002 | Ludtke | ..................... | H04L 29/06 375/E7.019 |
| 6,453,356 B1 * | 9/2002 | Sheard | ...................... | G06F 8/34 709/231 |
| 6,785,730 B1 * | 8/2004 | Taylor | ..................... | H04L 29/06 370/466 |
| 7,225,271 B1 * | 5/2007 | DiBiasio | ................. | H04L 47/10 709/224 |
| 7,363,342 B1 * | 4/2008 | Wang | ...................... | H04L 67/02 709/204 |

(Continued)

OTHER PUBLICATIONS

"Amazon Simple Queue Service," API Reference, API Version Nov. 5, 2012, Amazon Web Services, Copyright 2015, pp. 1-58 (63 pages total).

(Continued)

*Primary Examiner* — Dustin Nguyen
(74) *Attorney, Agent, or Firm* — Robert C. Kowert; Kowert, Hood, Munyon, Rankin & Goetzel, P.C.

(57) ABSTRACT

Techniques are described for employing a queue service as an intermediary to communicate messages between separate networks. A first proxy service may access a request generated by a client device operating in a first network, the request initially indicating a destination that is a server device operating in a second network. The request may be an application level protocol request. The first proxy service may modify the request to include, as a destination, a queue maintained by a queue service that is accessible from the first and second networks. The first proxy service may enqueue the modified request in the queue. A second proxy service operating in the second network may retrieve the enqueued request and communicate the request to the server device. One or more responses generated by the server device may be enqueued in a queue by the second proxy service for delivery to the client device.

20 Claims, 10 Drawing Sheets

(56) References Cited

U.S. PATENT DOCUMENTS

| | | | |
|---|---|---|---|
| 8,111,715 B1* | 2/2012 | Pannell | H04L 12/4641 370/474 |
| 2006/0130069 A1* | 6/2006 | Srinivasan | H04L 51/14 719/314 |
| 2008/0077672 A1* | 3/2008 | Knight | H04L 51/26 709/206 |
| 2008/0178278 A1* | 7/2008 | Grinstein | H04L 63/0227 726/12 |
| 2009/0172395 A1* | 7/2009 | Chen | H04L 67/2819 713/168 |
| 2009/0193141 A1* | 7/2009 | Suresh | G06F 9/505 709/235 |
| 2010/0093441 A1* | 4/2010 | Rajaraman | H04L 67/2823 463/42 |
| 2010/0095165 A1* | 4/2010 | Freund | G06F 11/1443 714/48 |
| 2012/0131115 A1* | 5/2012 | Levell | G06F 9/466 709/206 |
| 2012/0131683 A1* | 5/2012 | Nassar | G06F 17/301 726/28 |
| 2016/0071096 A1* | 3/2016 | Rosca | G06Q 20/3674 705/67 |
| 2016/0337465 A1* | 11/2016 | Tarre | H04L 67/2823 |

OTHER PUBLICATIONS

"Amazon Simple Queue Service," Developer Guide, API Version Nov. 5, 2012, Amazon Web Services, Copyright 2015, pp. 1-127 (132 pages total).

* cited by examiner

CROSS-PARTITION MESSAGING USING DISTRIBUTED QUEUES

BACKGROUND

A business or other organization may deploy server devices, storage nodes, or other computing devices in a variety of geographic locations, and the computing devices may be configured to provide various services related to online shopping, electronic commerce, digital media delivery, gaming, communications, web search, social networking, and so forth. Such services may be provided through one or more software systems executing on the computing devices, as in a distributed software deployment on the computing devices. In the course of providing services, a computing device may communicate and exchange information with other computing devices in geographically diverse locations. If communications between computing devices are delayed or unsuccessful, the operation of the one or more software systems may be impaired, which may negatively affect the experience of end-users of the services.

Figure 1:
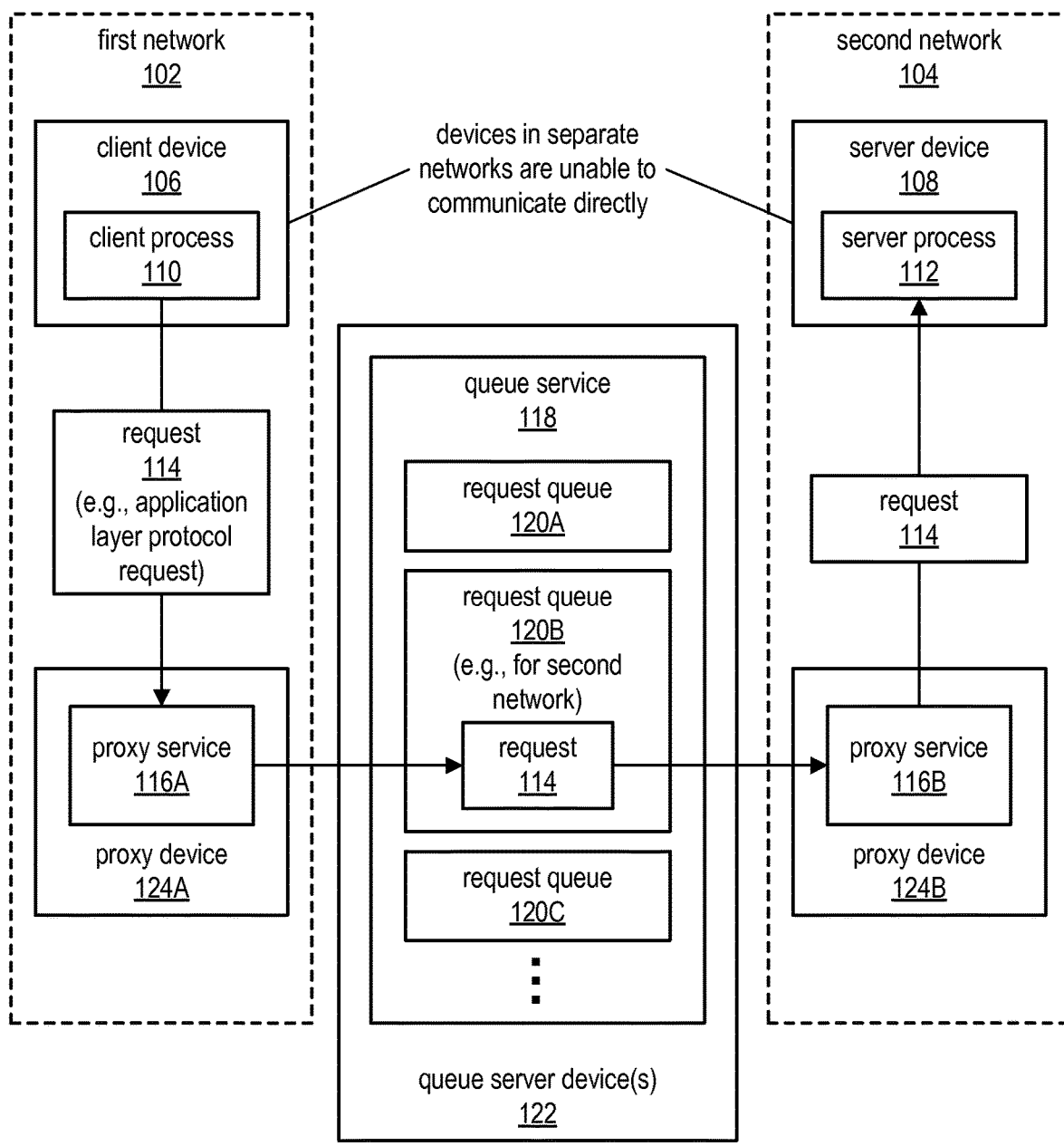
FIG. 1 is a block diagram illustrating one or more embodiments in which computing devices communicate via a queue service.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems, devices, methods, and computer-readable media to implement communications between devices or services, where such communications employ a queue service as an intermediary between devices or services. In some embodiments, a network may be partitioned into two or more separate networks such that a computing device (e.g., host) in one network may be unable to communicate directly with a computing device in a different network. For example, a network may be partitioned such that a first computing device has an Internet Protocol (IP) address of 123.456.789.012 in a first network, and a second, different computing device has the same address 123.456.789.012 in a second network. In some embodiments, different networks may be associated with different geographic locations or regions. For example, a first network may interconnect computing devices in a first geographic region (e.g., eastern Asia) and a second network may interconnect computing devices in a second geographic region (e.g., western North America). In some cases, the network may have been partitioned into multiple networks to increase the number of addresses that are available for assignment to devices. In some embodiments, a first device (or a first service running on the first device) may be unable to communicate directly with a second device (or a second service running on the second device) if the first and second devices are in different networks. For example, a first service may be configured to communicate with a second service at IP address 123.456.789.012. However, if that particular address is assigned to multiple hosts in different networks, the first service may be unable to resolve the particular host that is the appropriate target for a communication.

Using the embodiments described herein, a first device may communicate (e.g., indirectly) with a second device in a separate network by employing a queue service as an intermediary. For example, a first service running on the first device in a first network may be configured to send a request, such as a HyperText Transfer Protocol (HTTP) request, to a second service running on a second device in a second network that is separate from the first network. If the first service is unable to send the request directly to the second service, the first service may instead send the request to a first proxy service that is accessible from the first network. The first proxy service may then queue the request in one of a plurality of request queues provided by a queue service that is accessible from multiple networks. The request may then be retrieved by a second proxy service that is accessible from the second network. The second proxy service may provide the retrieved request to the second service that was the destination of the original request sent by the first service. The second service may process the request and, in some cases, generate a response (e.g., a HTTP response) that is communicated back to the first service via the proxy services and the queue service. In some embodiments, the communications (e.g., the request and the response) may be modified by a proxy service prior to being enqueued in a queue for delivery. For example, the request may be modified to include one or more headers or other information that identify a queue in which the response is to be enqueued. A proxy service may monitor that queue to detect the presence of a response to be delivered to the first service that originally generated the request.

The queue service may be accessible from multiple networks such that one or more queues are available for communicating messages between networks. Accordingly, embodiments enable devices or services in separate networks to communicate with one another where such inter-network communications may be otherwise blocked. In some embodiments, the queue service may be implemented on one or more queue server devices that are configured for high availability, to ensure that the messages are delivered via the queue service reliably and expeditiously.

The methods described herein may in various embodiments be implemented by any combination of hardware and software. For example, in one embodiment, the methods may be implemented by a computer system that includes a processor executing program instructions stored on a computer-readable storage medium coupled to the processor. The program instructions may be configured to implement the functionality described herein.

FIG. 1 illustrates an example environment in which one or more embodiments may operate. As shown in FIG. 1, the environment may include a first network 102 and a second network 104. The first network 102 and the second network 104 may each enable any number of computing devices to communicate with each other, using any network communication protocol, over wired or wireless network links. The first network 102 may be described as including a first set of computing devices that communicate using the first network 102, and the second network 104 may be described as including a second set of computing devices that communicate using the second network 104. The first set of computing devices may include one or more devices that are not included in the second set of computing devices. In some embodiments, the first network 102 may be separate from the second network 104, such that no computing devices are included in both the first network 102 and the second network 104. The first network 102 and the second network 104 may each include any number of hubs, routers, switches, backbones, or other network appliances that facilitate communications over the first network 102 or the second network 104.

The first network 102 and the second network 104 may each support a set of network addresses that are assignable to identify the set of computing devices in each respective network. A set of network addresses for a network may be described as the address space for the network. In some embodiments, the first network 102 and the second network 104 may have independent address spaces, such that the addresses for the devices in the first network 102 are assigned independently of the assignment of addresses to the devices in the second network 104. Accordingly, a computing device in the first network 102 may have a same network address as a computing device in the second network 104. For example, a computing device in the first network 102 may be assigned the network address 123.456.789.012, and a computing device in the second network 104 may be assigned the same network address 123.456.789.012. Although various examples herein may describe a network address as an IP address, embodiments support the use of other formats and network protocols for addressing. An address, such as an IP address, may identify a device at the network layer of the Open Systems Interconnection (OSI) model as promulgated by the International Organization for Standardization (ISO) and as maintained under the standard identification ISO/IEC 7498-1. An address, such as an IP address, may also identify a device at the Internet layer of the Internet protocol suite, e.g., the transmission control protocol (TCP)/IP model, maintained by the Internet Engineering Task Force (IETF). Alternatively, an address may identify a device at any other layer of the OSI model, the Internet protocol suite, or any other networking model or communication suite.

In some embodiments, a computing device in the first network 102 may be unable to communicate directly with a computing device in the second network 104. As an example of a direct communication, a process running on a device may send a request (e.g., a HTTP GET, POST, etc.) that is addressed to a hostname for a host executing a service. The hostname may be resolved to a network address (e.g., an IP address) using a Domain Name System (DNS) or through other means. If the device that sent the request is in a same network as the host executing the target service, the target hostname may be successfully resolved to determine the address of the appropriate destination for the request. In such cases, the request may be sent directly to the target host, which may respond to the request. A direct communication may be described as direct even in cases where the communication is sent via one or more network appliances (e.g., routed). In cases where a network has been partitioned into multiple networks, such as the first network 102 and the second network 104, the hostname may not be successfully resolved to determine the address of the destination host given that multiple hosts in various networks may be assigned the same network address.

As shown in FIG. 1, the first network 102 may include a client device 106 and the second network 104 may include a server device 108. The client device 106 may execute a client process 110 that is configured to communicate with a server process 112 executing on the server device 108. For example, the client process 110 may generate a message that is to be sent to the server process 112, and the message may request data to be provided to the client process 110. In some embodiments, the client process 110 may generate a request 114 for data, the request 114 identifying the server process 112 or the server device 108 as a target of the request 114. In some embodiments, the server process 112 may be at least a part of a web service executing on the server device 108. In such cases, the request 114 may be a HTTP request such as a GET or a POST. The request 114 may also be formatted according to any other protocol that operates at the application layer, such as File Transfer Protocol (FTP), Internet Message Access Protocol (IMAP), Simple Network Management Protocol (SNMP), Simple Mail Transfer Protocol (SMTP), Lightweight Directory Access Protocol (LDAP), and so forth. In some embodiments, the request 114 may be formatted according to a protocol that operates at a layer other than the application layer, such as at one or more of the presentation layer, session layer, transport layer, or network layer of the OSI model, or at one or more of the transport layer or internet layer of the Internet protocol suite. In some embodiments, the server process 112 may be an interface to a data storage system implemented on the server device 108 or other device(s). In such cases, the request 114 may be a query to request a set of data from the data storage system.

In cases where the client device 106 is unable to communicate directly with the server device 108, the client process 110 may send the request 114 to a proxy service 116A that is executing in, or otherwise accessible from, the first network 102. In some embodiments, the proxy service 116A may execute on a proxy device 124A that is in the first network 102. The proxy service 116A may enqueue the request 114 in a queue that is maintained by a queue service 118. In some embodiments, the proxy service may execute on one or more queue server devices 122 such that the queue service 118 is accessible from multiple networks including both the first network 102 and the second network 104. In some embodiments, the queue service 118 may be accessible over the Internet. The queue service 118 may maintain or otherwise provide one or more request queues 120. Each request queue 120 may be associated with a particular network, such that the request queue 120 includes messages that are to be sent to devices or services operating in the network. In the example of FIG. 1, the proxy service 116A has enqueued the request 114 in the request queue 120B that is associated with the second network 104 in which the targeted server process 112 is executing. In some embodiments, the request 114 may include information that indicates one or both of the request queue 120B or the second network 104 as a destination of the request 114. The proxy service 116A may employ such information to determine the particular request queue 120 in which to enqueue the request 114. The modification of the request 114 to incorporate destination information is described further with reference to FIGS. 4 and 5.

In some embodiments the proxy service 116A may serialize the request 114 and enqueue the serialized request 114 in the request queue 120B that is associated with the second network 104. In some embodiments, the request 114 may be serialized at least partly according to a version of JavaScript Object Notation (JSON) as described in one or both of the IETF Request for Comments (RFC) 7159 dated March 2014 or the European Computer Manufacturers Association (ECMA) International standard document ECMA-404 dated October 2013. Embodiments also support the use of other formats for serializing the request 114, including but not limited to any version of Extensible Markup Language (XML) or any encoding scheme based on a version of the American Standard Code for Information Exchange (ASCII).

In some embodiments, the request 114 may be encrypted by the proxy service 116A prior to enqueuing. In some cases where the request 114 is serialized, the serialized request 114 may be encrypted. Encryption may ensure the security of the request 114 in cases where the various queues of the queue service 118 are publicly accessible over the Internet or otherwise. Embodiments support the use of any encryption technique to secure the enqueued message, including but not limited to any version of Pretty Good Privacy (PGP), Transport Layer Security (TLS), or GNU Privacy Guard (GPG). Encryption may be based on a symmetric key algorithm or a public-key algorithm such as any version of the Digital Signature Algorithm (DSA), the Rivest Shamir Adleman (RSA) algorithm, or any other algorithm.

As shown in FIG. 1, the second network 104 may include a proxy service 116B executing on a proxy device 124B operating in the second network 104. The proxy service 116B may monitor the request queue 120B for the second network 104. On detecting that the request 114 has been enqueued in the request queue 120B, the proxy service 116B may retrieve the enqueued request 114 from the request queue 120B. In embodiments where the request 114 is encrypted prior to enqueuing, the proxy service 116B may decrypt the request 114 after retrieving it from the request queue 120B. In embodiments where the request 114 is serialized prior to enqueuing, the proxy service 116B may deserialize the request 114 after retrieving it from the request queue 120B. In cases where the request 114 has been modified to indicate a destination queue or network, as described with reference to FIGS. 4 and 5, the proxy service 116B may undo such modifications and at least partly restore the request 114 to its original form. The proxy service 116B may then communicate the request 114 to the server process 112 that was the original target of the request 114.

Figure 2:
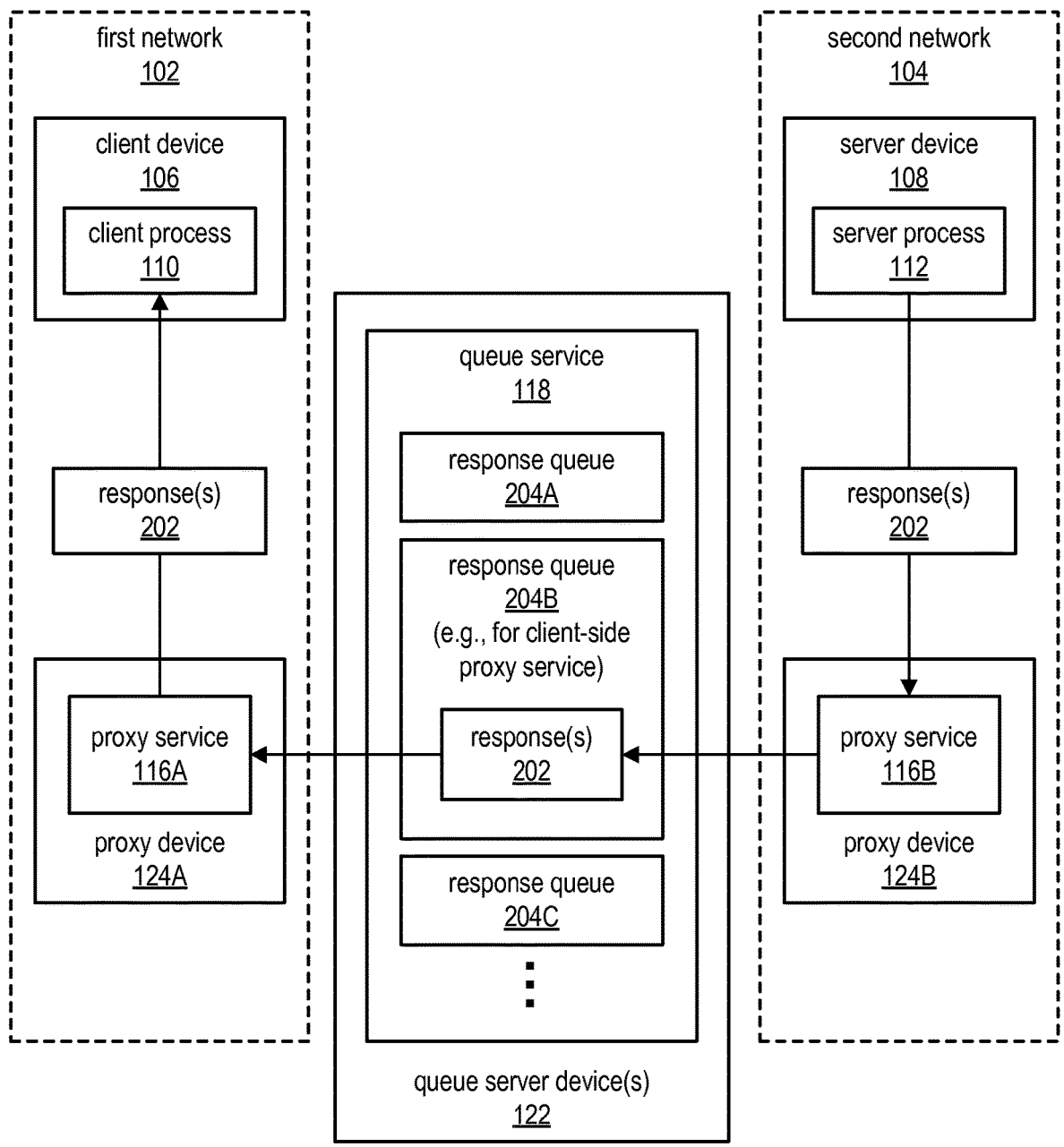
FIG. 2 is a block diagram illustrating one or more embodiments in which computing devices communicate via a queue service.

FIG. 2 illustrates an example environment in which one or more embodiments may operate. The elements of FIG. 2 may be configured similarly to like-numbered elements of FIG. 1, and may perform similar operations to those of like-numbered elements of FIG. 1. After receiving the request 114, the server process 112 may analyze or otherwise process the request 114 to generate one or more responses 202. In some cases, the server process 112 may call one or more other services to request data to be included in the response(s) 202. In some cases, the server process 112 may generate a single response 202 in response to the request 114. For example, in cases where the request 114 is a HTTP request, the response 202 may be a HTTP response. In some cases, the server process 112 may generate multiple responses 202 in response to a single request 114. The response(s) 202 may be sent to the proxy service 116B for enqueuing in a response queue 204 maintained by the queue service 118. In some embodiments, the response(s) 202 may be serialized prior to being enqueued in a response queue 204, as described with respect to the serialization of the request 114. In some embodiments, the response(s) 202 may be encrypted prior to being enqueued, as described with respect to the encryption of the request 114. In some embodiments, a response queue 204 may be exclusively associated with a single proxy service 116A, such that the proxy service 116A monitors the response queue 204 for enqueued response(s) 202 to the request 114. In some embodiments, a response queue 204 may be exclusively associated with a particular client device 106, or a particular client process 110, such that the response queue 204 is assigned to convey response(s) 202 to request(s) 114 sent by the particular client device 106 or client process 110.

In some embodiments, the enqueued request 114 may have included information describing a particular response queue 204 where the response(s) 202 to the request 114 are to be enqueued. The proxy service 116A may have modified the request 114 to include such information describing the particular response queue 204, and the proxy service 116A may monitor that response queue 204 for response(s) 202 to the request 114. In such embodiments, the proxy service 116B may enqueue the response(s) 202 in the particular response queue 204B identified by the response queue information that was included in the request 114 by the proxy service 116A. The response queue information is described further with reference to FIGS. 4 and 5.

The proxy service 116A may monitor the response queue 204B. On detecting that the response(s) 202 have been enqueued in the response queue 204B, the proxy service 116A may retrieve the response(s) 202 from the response queue 204B. In cases where the response(s) 202 were encrypted prior to enqueuing, the proxy service 116A may decrypt the response(s) 202. In cases where the response(s) 202 were serialized prior to enqueuing, the proxy service 116A may deserialize the response(s) 202. The response(s) 202 may then be sent to the client process 110. The client process 110 may process the response(s) 202 as if the response(s) 202 had been received directly from the server process 112 in response to the request 114.

Although particular computing devices may be described as a client device 106 or a server device 108, such descriptions should not be construed as limiting of embodiments. A computing device that acts as a client device 106 in certain circumstances (e.g., to generate a request 114 to a server process 112) may act as a server device 108 in other circumstances. Similarly, a computing device that acts as a server device 108 in certain circumstances (e.g., to receive and process a request 114) may act as a client device 106 in other circumstances. Moreover, embodiments are not limited to using a queue service 118 to mediate communications sent according to a client-server paradigm. Embodiments also support other types of communications, such as communications sent between devices acting as peers in a peer-to-peer communication scheme.

The messages exchanged via the queue service 118, such as the request 114 and the response(s) 202, may be arranged according to a communication protocol that operates at any level of a communication suite such as the OSI model or the Internet protocol suite. In some embodiments, the messages may be arranged according to a protocol that operates at an application layer of a communication suite, such as HTTP, HTTP Secure (HTTPS), IMAP, FTP, SNMP, SMTP, LDAP, and so forth. In some cases, the protocol may provide for a single response 202 to be generated and sent to the client process 110 in response to the request 114. Alternatively, the protocol may provide for multiple response(s) 202 to be generated and sent to the client process 110 in response to the request 114. Such embodiments are described further with reference to FIG. 9. In some cases, the messages may be arranged according to a multiplexing, multi-stream communication protocol such as any version of SPDY™ developed primarily at Google Inc. of Mountain View, Calif., USA.

Although examples herein may describe the queue service 118 as mediating communications between two separate networks, embodiments are not so limited. Embodiments support the use of the queue service 118 to mediate communications among any number of networks. For example, a broader network may have been partitioned into any number of different networks, where each network interconnects devices within a particular geographic region. In such cases, the queue service 118 may mediate among the multiple networks associated with different geographical regions.

In some embodiments, one or both of the client side and server side environments of FIGS. 1 and 2 may include multiple proxy services 116A and multiple proxy services 116B respectively. In such cases, a client side gateway device or service may operate to manage connections between the client process 110 and the proxy services 116A. A server side gateway device or service may operate to manage connections between the server process 112 and the proxy services 116B. Such gateway devices or services may be assigned a virtual IP (VIP) address. The client process 110 may initially establish a connection with the VIP address of the gateway on the client side. The gateway device or service may determine a particular proxy service 116A that is available to handle communications to and from the client process 110. The gateway device or service may then send, to the client process 110, an identifier (ID) that identifies the determined proxy service 116A. In some cases, the client process 110 may exchange a series of messages with the proxy service 116A, such as in a handshake, to establish a connection (e.g., TCP connection) with the proxy service 116A. The established connection may then be used to send the request 114 to the proxy service 116A. The connection may also be used to send the response(s) 202 to the client process 110. The gateway device or service on the server side may operate similarly to establish a connection between a proxy service 116B and the server process 112.

Figure 3:
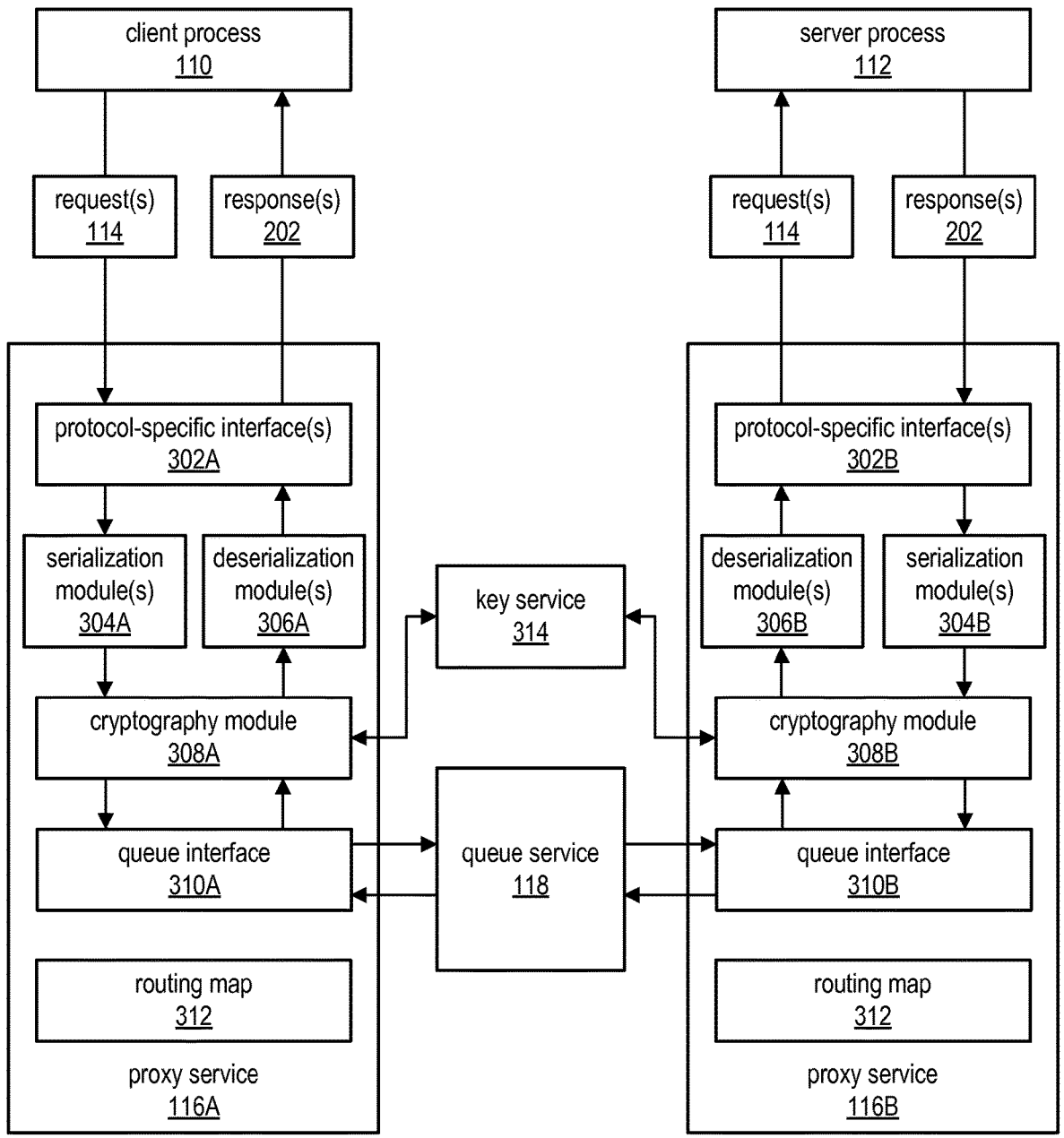
FIG. 3 is a block diagram illustrating examples of proxy services that may execute on computing devices to facilitate communication via a queue service.

FIG. 3 is a block diagram illustrating examples of the proxy service(s) 116A and 116B that may facilitate communications via the queue service 118. The elements of FIG. 3 may be configured similarly to like-numbered elements of FIGS. 1 and 2, and may perform similar operations to those of like-numbered elements of FIGS. 1 and 2. As shown in FIG. 3, the proxy service 116A may include one or more modules such as one or more protocol-specific interface(s) 302A, one or more serialization module(s) 304A, one or more deserialization module(s) 306A, one or more cryptography module(s) 308A, and one or more queue interface(s) 310A. The proxy service 116B may include one or more modules such as one or more protocol-specific interface(s) 302B, one or more serialization module(s) 304B, one or more deserialization module(s) 306B, one or more cryptography module(s) 308B, and one or more queue interface(s) 310B.

In some embodiments, a request 114 generated by the client process 110 may be received at a protocol-specific interface 302A that is a component of the proxy service 116A. The protocol-specific interface 302A may modify the request 114 to add information describing one or more of the following: the second network 104 that is the destination of the request 114, the request queue 120 where the request 114 is to be enqueued, a response queue 204 where the response(s) 202 to the request 114 are to be enqueued; or a region corresponding to the first network 102. The protocol-specific interface 302A may also perform other modifications to the request 114. In some embodiments, request 114 is sent to a protocol-specific interface 302A that corresponds to the particular communication protocol employed by the request 114. For example, the protocol-specific interfaces 302A may include interfaces corresponding to HTTP, HTTPS, IMAP, FTP, SNMP, SMTP, LDAP, SPDY™, and so forth. A request 114 that is a HTTP request may be sent to the protocol-specific interface 302A that is configured to analyze and modify HTTP requests.

After it has been modified by the protocol-specific interface 302A, the request 114 may be accessed by a serialization module 304A. In some embodiments, the proxy service 116A may include multiple serialization modules 304A configured to serialize requests 114 that employ different communication protocols. In such embodiments, the request 114 may be accessed by the serialization module 304A corresponding to the protocol employed by the request 114. The serialization module 304A may serialize the request 114 according to a version of JSON or some other serialization format. In some embodiments, after it has been serialized, the request 114 may be encrypted by a cryptography module 308A that is a component of the proxy service 116A. The request 114 may then be accessed by a queue interface 310A that enqueues the request 114 in the appropriate request queue 120. In some embodiments, the proxy service 116A may include a separate queue interface 310A for each of the request queues 120 provided by the queue service 118, and a queue interface 310A may be configured to enqueue requests 114 in a particular request queue 120. Alternatively, a queue interface 310A may be configured to enqueue requests 114 in multiple request queues 120.

On the server side, the proxy service 116B may include a queue interface 310B that monitors the request queue 120 where the request 114 was enqueued. The queue interface 310B may retrieve the enqueued request 114, and the cryptography module 308B may decrypt the request 114. A deserialization module 306B may deserialize the request 114. In some embodiments, the proxy service 116B may include multiple deserialization modules 306B configured to deserialize messages that employ different communication protocols. The request 114 may then be accessed by a protocol-specific interface 302B corresponding to the protocol of the request 114. The protocol-specific interface 302B may send the request 114 to the server process 112 using the particular communication protocol of the request 114.

The server process 112 may receive the request 114 and generate the response(s) 202 in response to the request 114. The response(s) 202 may be sent to the proxy service 116B and processed in a similar manner as the request 114 was processed by the proxy service 116A. For example, the response(s) 202 may be received by a protocol-specific interface 302B corresponding to the particular protocol of the response(s) 202. The response(s) 202 may then be serialized by a serialization module 304B corresponding to the protocol, encrypted by a cryptography module 308B, and enqueued in the response queue 204 by the queue interface 310B. In some cases, the protocol-specific interface(s) 302A and 302B may include one or more ports (e.g., TCP ports) that are employable by the client process 110 and the server process 112 to communicate with the interfaces.

On the client side, the queue interface 310A may monitor the response queue 204 and retrieve the response(s) 202 from the response queue 204. The response(s) 202 may then be decrypted by the cryptography module 308A, deserialized by a deserialization module 306A corresponding to the communication protocol, and accessed by a protocol specific interface 302A and sends to the response(s) 202 to the client process 110 using the communication protocol. In this way, the proxy services 116A and 116B, and the queue service 118, and function as an intermediary to facilitate communications between the client process 110 and the server process 112 in scenarios where such communications may otherwise be impossible. In some embodiments, multiple proxy services 116A may operate on the client side and each proxy service 116A may monitor a different response queue 204 for the response(s) 202. Alternatively, a proxy service 116A may monitor multiple request queues 204. The queue service 118 may provide any number of request queues 120, response queues 204, or other queues for mediating communications between separate networks.

In some embodiments, one or both of the proxy service 116A or the proxy service 116B may include, or have access to, a routing map 312. The routing map 312 may be arranged as a lookup table that provides, for one or more hostnames, a mapping between a hostname and the request queue 120 where messages to that hostname are to be enqueued. In some embodiments, the queue service 118 may maintain request queues 120 that each correspond to a different network, and each network may include computing devices in a particular geographic region. For example, one network may include devices in Europe, another network may include devices in southern Asia, and another network may include devices in South America. In such cases, the queue service 118 may maintain a request queue 120 for each region: Europe, southern Asia, and South America. The routing map 312 may list, for each hostname, the region where the host is located. In some embodiments, the queue interface 310A may employ the routing map 312 to determine the particular request queue 120 in which to enqueue the request 114, by determining which region includes the host that is the target of the request. In some embodiments, the proxy service 116B may not employ the routing map 312 to determine a response queue 204 in which to enqueue response(s) 202. Instead, the proxy service 116B may enqueue response(s) 202 in a response queue 204 that is identified in the request 114 (e.g., in a header), as described further herein.

Although the protocol-specific interfaces 302, serialization modules 304, deserialization modules 306, cryptography modules 308, and queue interfaces 310 are depicted in FIG. 3 as separate sub-modules of the proxy services 116, in some embodiments the functionality of two or more of these sub-modules may be performed by a same software module. In some cases, the functionality of one or more of the sub-modules of the proxy service 116A may be performed by the client process 110 or other software modules executing on the client device 106. The functionality of one or more of the sub-modules of the proxy service 116B may be performed by the server process 112 or other software modules executing on the server device 108.

In some embodiments, the proxy services 116A and 116B and their sub-modules may be arranged according to a pluggable architecture. In such cases, to provide support for a new communication protocol, a new protocol-specific interface 302, serialization module 304, and deserialization module 306 may be implemented to handle messages that are formatted according to the new communication protocol. The new modules may then be plugged into, or otherwise incorporated into, the proxy service 116A and proxy service 116B, to enable the cross-network communication of messages that are arranged according to the new protocol. The proxy services 116A and 116B may support any number of communication protocols. In some embodiments, any protocol-specific implementation may be included in the proxy services 116A and 116B, and not included in the queue service 118. Accordingly, the queue service 118 may be described as protocol-agnostic.

In some embodiments, the cryptography modules 308A and 308B may communicate with a key service 314 to access cryptographic keys or other cryptographic information. The key service 314 may be accessible from the first network 102 and the second network 104. Keys may be private keys or public keys. In some cases, the cryptography module 308A may have access to a public key for use in encrypting the request(s) 114, and the cryptography module 308B may have access to a private key for use in decrypting the request(s) 114. In some cases, cryptography modules 308A and 308B may employ a single pair of public and private keys across multiple proxy services 116. Alternatively, a particular pair of proxy services 116A and 116B may employ a pair of public and private keys that are exclusively assigned for use by the pair of proxy services 116A and 116B. Such exclusivity may prevent a misrouted request 114 from being decrypted by a proxy service 116B that inappropriately retrieved the request 114 from the queue service 118. Different pairs of keys may also provide additional security, such that all proxy services 116 may not be compromised if a single proxy service 116 is compromised.

Figure 4:
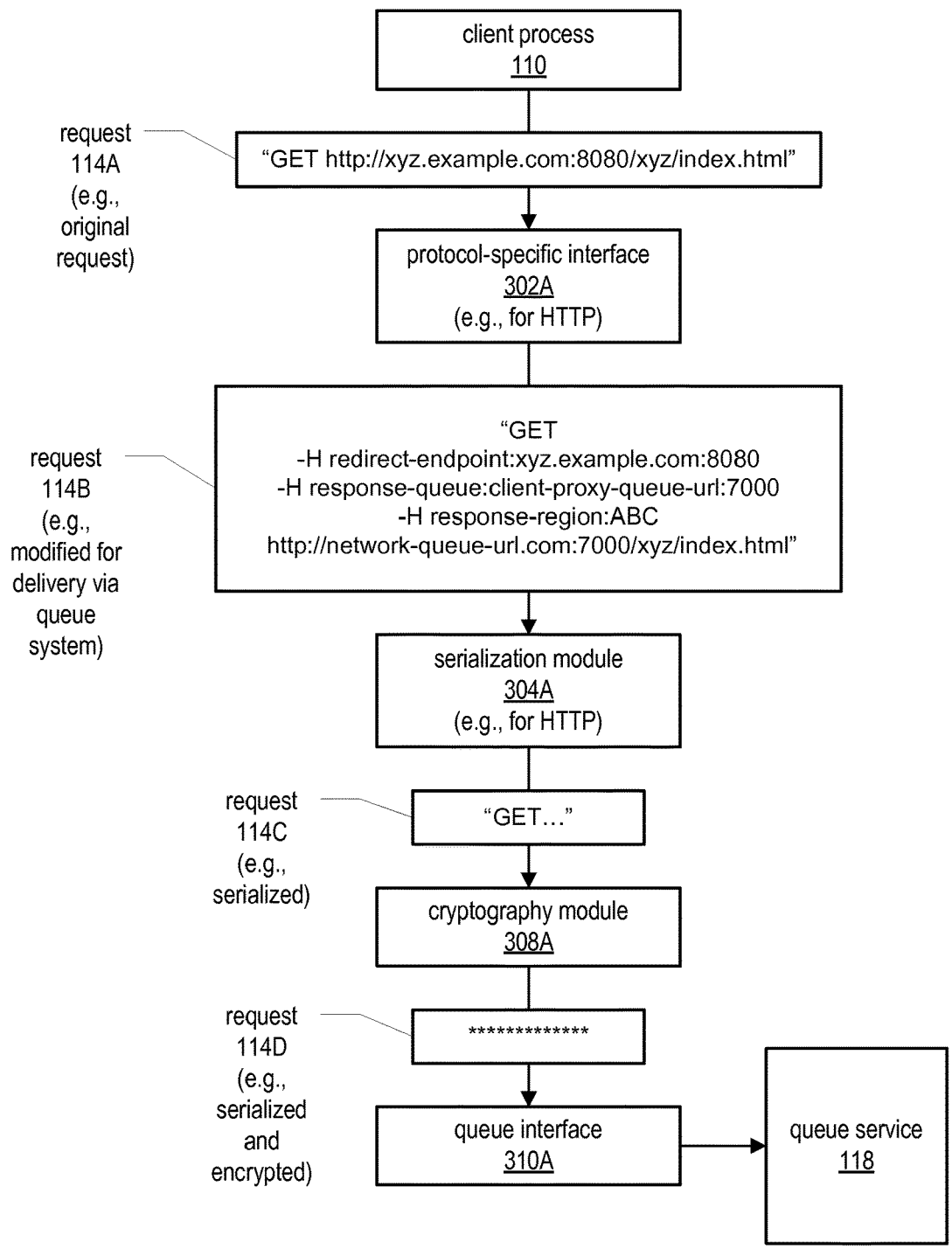
FIG. 4 is a block diagram illustrating the modification of a message for communication via a queue service, according to one or more embodiments.

FIG. 4 illustrates an example of the modification of a message, such as the request 114 or the response(s) 202, for communication via the queue service 118. In the example of FIG. 4, the client process 110 generates an original request 114A that is a HTTP GET request. Embodiments also support other types of HTTP requests, or other types of requests 114 that are formatted according to other protocols. The original request 114A may include a Uniform Resource Identifier (URI), such as a Uniform Resource Locator (URL) or a Uniform Resource Name (URN). As in the example of FIG. 4, the URI of the original request 114A may indicate the protocol (e.g., "http"), the host domain that is the target of the request 114 (e.g., "xyz.example.com"), a port number where the request 114 is to be sent at the host (e.g., "8080"), and a path to a particular item of requested content (e.g., "xyz/index.html").

The request 114A may be received by a protocol-specific interface 302A. In this example, the request 114A may be received by the protocol-specific interface 302A corresponding to HTTP, given that the request 114A is arranged as a HTTP request. In some embodiments, the protocol-specific interface 302A may modify the request 114A to generate a modified request 114B. Such modifications are illustrated in more detail in FIG. 5.

Figure 5:
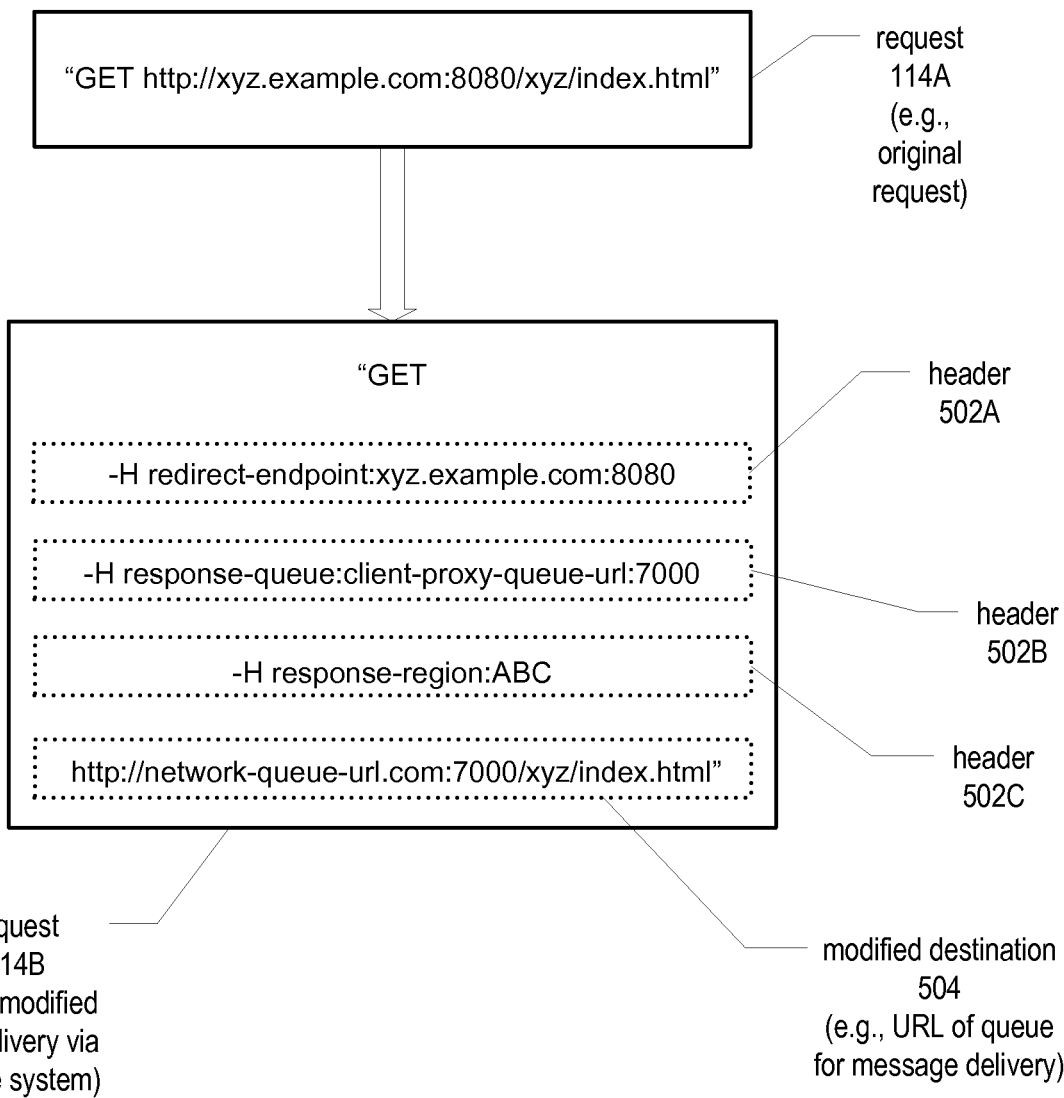
FIG. 5 is a block diagram illustrating an example of modifying a message for communication via a queue service, according to one or more embodiments.

As shown in FIGS. 4 and 5, the modifications may include replacing at least a portion of the URI of the original request 114A with a modified destination 504. The modified destination 504 may be a URI that identifies the request queue 120 where the request 114 is to be enqueued. In the example of FIGS. 4 and 5, the target domain and port number "http://xyz.example.com:8080" has been replaced with the modified destination 504 "http://network-queue-url.com:7000", which identifies a network location of the particular request queue 120 where the request 114 is to be enqueued. As described above with reference to FIG. 3, in some embodiments the particular request queue 120 may be determined by looking up the hostname (e.g., "xyz.example.com") in the routing map 312 to determine which region includes that host. The request queue 120 for enqueuing the request 114 may be the particular queue associated with the region. The modified destination 504 may also include the originally specified path to the requested content, in this example "/xyz/index.html".

In some embodiments, the replaced portion of the original URI may be moved into a header 502A that is included with the modified request 114B. In the example of FIGS. 4 and 5, the modified request 114B includes the header 502A "redirect-endpoint: xyz.example.com:8080" to indicate the original target host and port number of the request 114. In this example, "redirect-endpoint" is a parameter name indicating that the data following the colon, "xyz.example.com:8080" is the value of the named parameter.

In some embodiments, the modified request 114B may include a header 502B that indicates a particular response queue 204 where the response(s) 202 to the request 114 are to be enqueued by the proxy service 116B. In the example of FIGS. 4 and 5, the header 502B includes a parameter name "response-queue" and the value of the "response-queue" parameter "client-proxy-queue-url:7000", which identifies the response queue 204. In some embodiments, the queue service 118 may maintain a plurality of response queues 204 for each of one or more geographic regions. Alternatively, a plurality of queue services 118 may each maintain a plurality of response queues 204 corresponding to a particular region. In such cases, the modified request 114B may also include a header 502C that identifies a particular region where the response(s) 202 are to be enqueued. In some cases, each response queue 204 may be associated with a particular proxy service 116A, which monitors its response queue 204 for enqueued response(s) 202.

In some embodiments, at least some of the modifications to the request 114A to generate the request 114B may be performed by the client process 110, or another process executing on the client device 106, instead of by the protocol-specific interface 302A. For example, the client process 110 may include one or more libraries that intercept one or more requests 114 and perform the modifications to generate request(s) 114B, which may then be sent to the proxy service 116A. Alternatively, the client process 110 may be recoded or otherwise modified to generate modified request(s) 114B.

With reference to FIG. 4, the modified request 114B may be accessed by a serialization module 304A corresponding to HTTP as described above. The serialization module 304A may generate a serialized request 114C. At least a portion of the serialized request 114C may be encrypted by the cryptography module 308A to generate a serialized and encrypted request 114D. The queue interface 310A may enqueue the request 114D in a request queue 120 maintained by the queue service 118. As described above, the particular request queue 120 may that identified by the modified destination 504 in the request 114D.

In some embodiments, the client process 110 may be modified (e.g., manually recoded) to include the request 114 in the modified form, e.g., request 114B. Alternatively, the client process 110 may call a library, interface, or other software module that modifies the original request 114A to generate the request 114B. In some embodiments, the various URLs, addresses, or other network locations called by the client process 110 may be stored in a data file such as a lookup table, resource table, or configuration file, and generating the modified request 114B may include (e.g., manually) updating the location information in the data file to include modified location information. In some embodiments, the translation from the request 114A to the request 114B may be performed by a domain name service (DNS) that maps the URL of the original request 114A to the URL of the request queue 120.

In some embodiments, the original URL of the original destination of the request 114 (e.g., xyz.example.com) may be replaced with a URL associated with the proxy service 116A (e.g., xyz-proxy.example.com). The request 114 may then be routed to the proxy service 116A instead of being sent directly to the original destination (e.g., xyz.example.com). The proxy service 116A, or sub-component(s) of the proxy service 116A, may then perform additional modifications on the request 114 to add the header(s) 502 in add the modified destination 504 to the request 114. In some embodiments, a DNS may map the original URL (e.g., xyz.example.com) to a URL of the proxy service 116A (e.g., xyz-proxy.example.com).

In some embodiments, the header 502A (e.g., the redirect-endpoint header) may be incorporated into the request 114 initially by the client process 110 or the protocol-specific interface 302A, and the other headers 502B and 502C may be incorporated by the queue interface 310A or some other component after encryption of the request 114. Accordingly, the header 502A may be encrypted with the modified request 114B but the other headers 502B and 502C may be unencrypted in the request 114D that is enqueued with the queue service 118. In some embodiments, the original request 114A may be placed in an envelope and encrypted. Additional headers 502B and 502C (e.g., headers specific to the queue-based delivery process) may be added to generate the request 114D.

Figure 6:
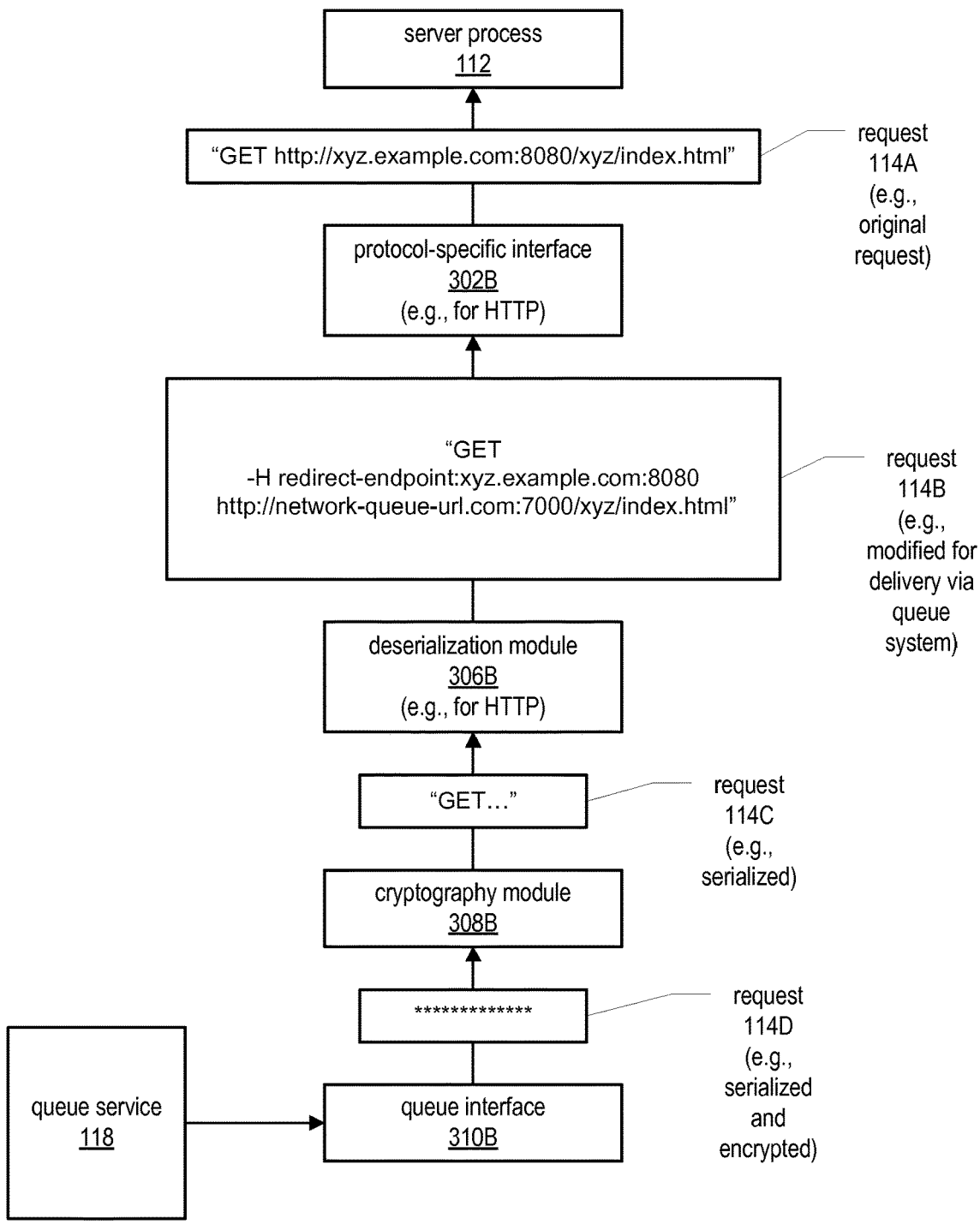
FIG. 6 is a block diagram illustrating the modification of a message following its communication via a queue service, according to one or more embodiments.

FIG. 6 illustrates an example of the modification of a message, such as the request 114 or the response(s) 202, following its retrieval from the queue service 118 on the server side. As described above, the queue interface 310B may monitor the request queue 120 where the request 114D was enqueued as described with reference to FIG. 4. On detecting the presence of the request 114D in the request queue 120, the queue interface 310B may retrieve the request 114D from the request queue 120. The request 114D may then be accessed and decrypted by the cryptography module 308B to generate the request 114C. The request 114C may be deserialized to generate the request 114B. Such deserialization may be performed by a deserialization module 306B corresponding to the particular communication protocol (e.g., HTTP). The request 114B may be accessed by a protocol-specific interface 302B corresponding to the particular protocol. The protocol-specific interface 302B may modify the request 114B to at least partly restore the request 114B to its original request 114A. Such modifications may include replacing the modified destination 504 with the original destination conveyed in the header 502A. In some embodiments, the modification may retain one or both of the headers 502B and 502C, to retain the information regarding the response queue 204 to be employed for communicating the response(s) 202. Although not shown in FIGS. 4-6, the processing of the response(s) 202 for communication to the client process 110 may proceed in a manner that is similar to the processing of the request 114 described in FIGS. 4-6, but with the client side operations being performed on the server side and the server side operations being performed on the client side.

In some embodiments, one or more of the headers 502A, 502B, or 502C may be removed from the request 114 prior to sending the request 114 to the server process 112. Accordingly, the request 114 that is received at the server process 112 may be the same request originally sent by the client process 110. In some embodiments. The proxy service 116B may save the information included in the headers 502B and 502C regarding the response queue 204 and response region, or retain such information in memory, and access that information to determine the particular response queue 204 in which to enqueue the response(s) 202. In some embodiments, the proxy service 116B may send the request 114 to the server process 112 and block while waiting for the response(s) 202. Accordingly, the interaction between the proxy service 116B and the server process 112 may be a synchronous process. Any errors (e.g., timeout, unknown resource requested, custom errors, other HTTP error codes, etc.) emitted by the server process 112 in response to the request 114 may be conveyed by the proxy service 116B to the client-side proxy service 116A using the queue service 118 as described herein, and subsequently sent on to the client process 110.

Figure 7:
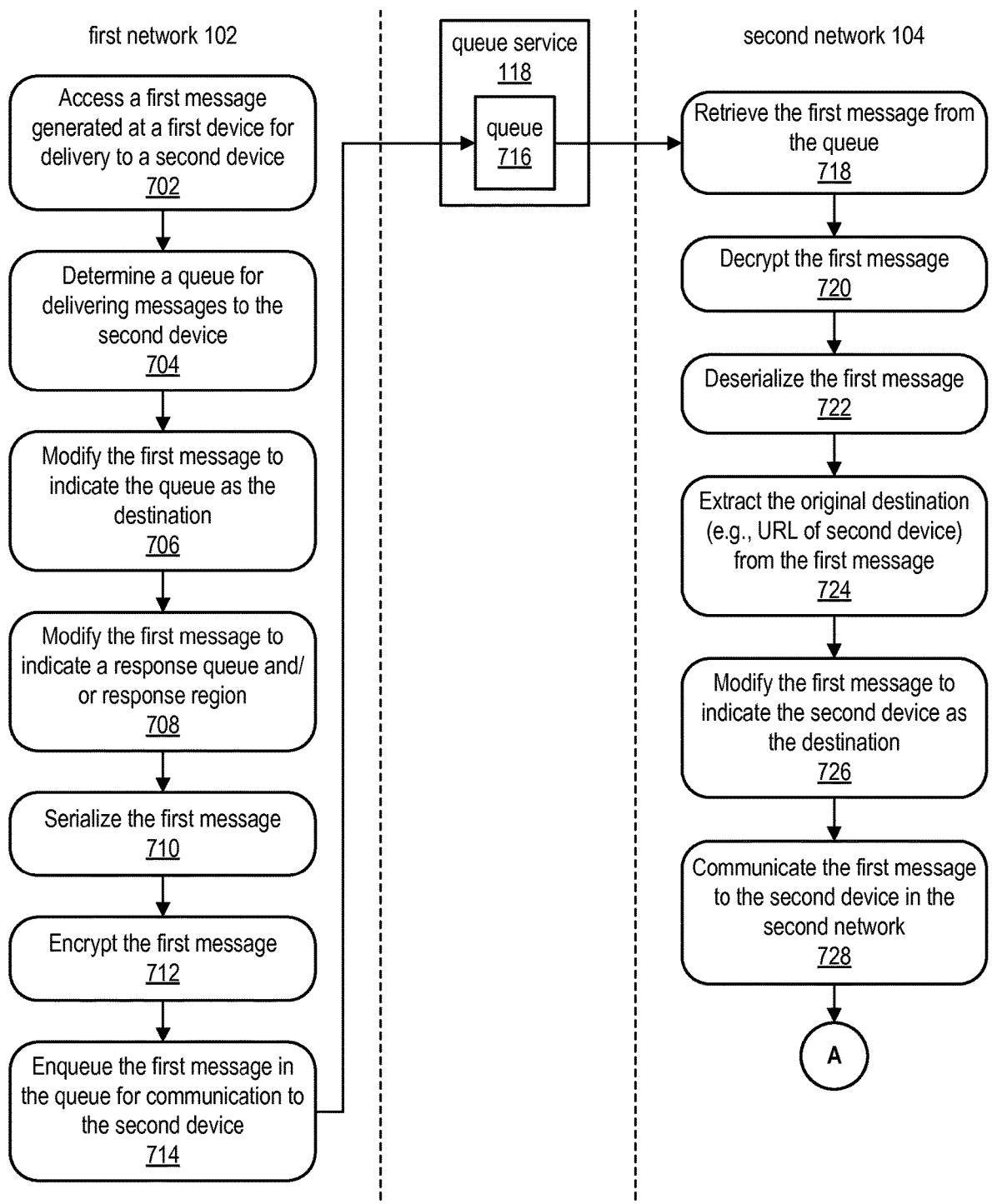
FIG. 7 is a flow diagram illustrating one or more embodiments of a method for communication via a queue service.
Figure 8:
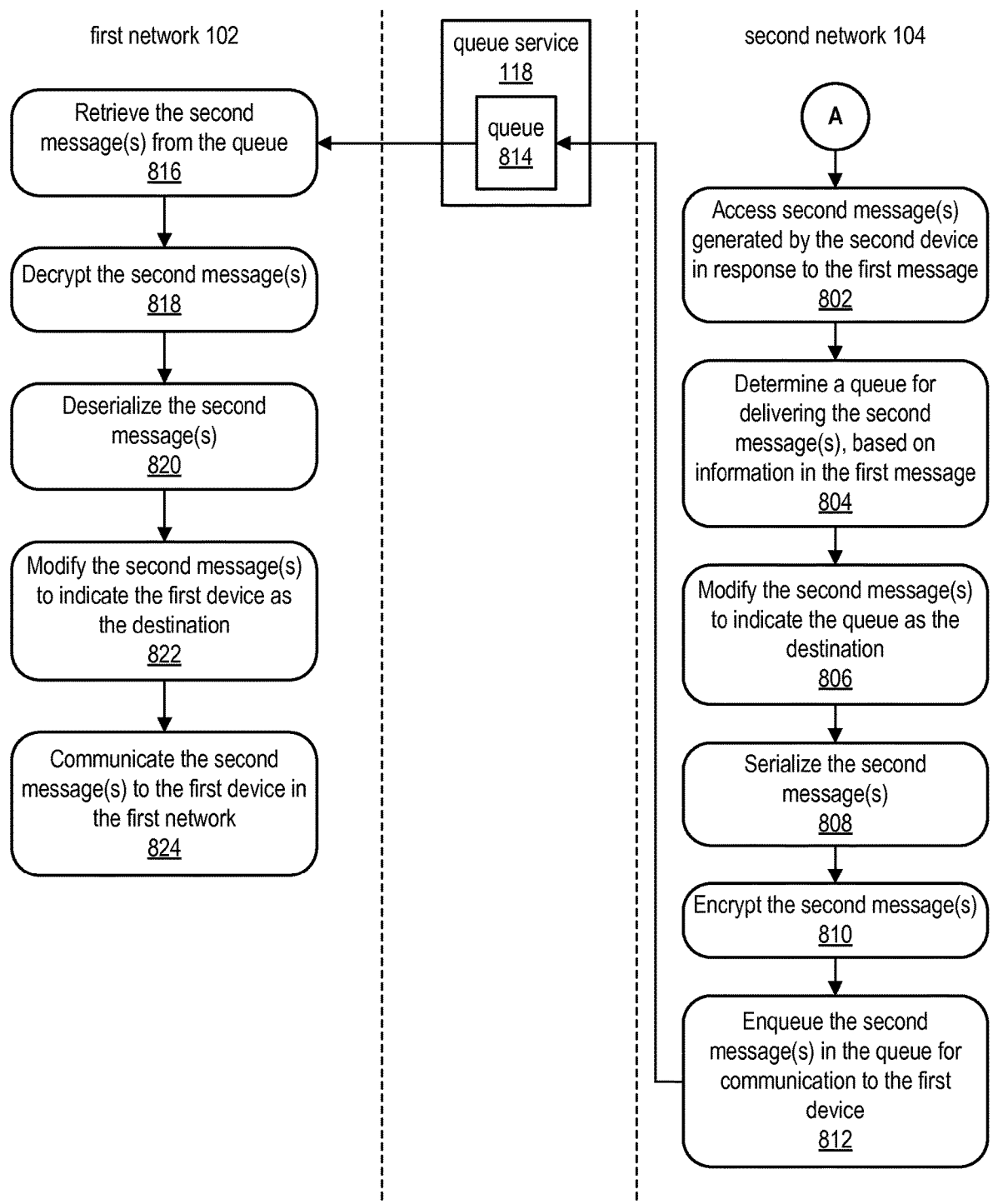
FIG. 8 is a flow diagram illustrating one or more embodiments of a method for communication via a queue service.

FIGS. 7 and 8 depict a flow diagram illustrating an example of a process for communicating messages between separate networks using a queue service 118 as an intermediary. Operations of the process may be performed by one or more of the client process 110, the proxy service 116A, the proxy service 116B, the server process 112, the queue service 118, or other modules executing on one or more of the client device 106, the server device 108, the proxy device 124A, the proxy device 124B, the queue server device(s) 126, or other computing device(s).

At 702, a first message is received or otherwise accessed. The first message may be the request 114 or another communication that is generated by a process on a first device. For example, the first message may be generated by the client process 110 executing on the client device 106. The first message may specific a destination that is a second device or a particular service executing on the second device. For example, the first message may target the server process 112 executing on the server device 108. As described above, in some cases the first message may be arranged according to an application layer protocol such as HTTP, HTTPS, IMAP, LDAP, FTP, SNMP, SMTP, SPDY™, and so forth. The first message may also be arranged according to a protocol that operates at a different layer of a multi-layer communication suite such as the OSI model or the Internet protocol suite. The first message may be generated at a first device (e.g., the client device 106) in a first network 102 for delivery to a second device (e.g., the server device 108) in a second network 104. The first network 102 may be separate from the second network 104, preventing the first device from communicating directly with the second device.

At 704, a queue may be determined for delivering messages to the second device in the second network 104. In some embodiments, the queue service 118 may maintain a plurality of queues, and each queue may correspond to a different network. Accordingly, the selected queue may be the particular queue that a proxy service 116B in the second network 104 monitors for enqueued messages. In some embodiments, each network may correspond to a geographic region. The routing map 312 may be employed to determine which geographic region, and which network, includes the second device that is the target of the first message.

At 706, the first message may be modified to indicate, as the destination of the first message, the queue determined at 704. In some embodiments, the first message may be modified as described with reference to FIGS. 4 and 5.

At 708, in some embodiments the first message may be further modified to indicate one or more of a response queue 204 or a response region, as described with reference to FIGS. 4 and 5. The indicated response queue 204 may be the particular queue to be employed for communicating one or more second messages (e.g., the response(s) 202) back to the first device, in cases where the second message(s) are generated as response(s) to the first message. The response region may indicate the geographic region associated with the first network 102, in cases where each region (or each first network 102) may be associated with a particular set of response queue(s) 204.

At 710, the first message may be serialized as described above. At 712, in some embodiments the first message may be encrypted as described above. At 714, the first message may be enqueued in the queue 716 determined at 704. The first message may be enqueued in a serialized format, an encrypted format, or in a format that is both serialized and encrypted. Enqueuing the first message in the queue 716 may enable the first message to be communicated to the second device in the second network 104. In some cases, the queue 716 may be one of the request queues 120 corresponding to the second network 104. In some embodiments, as described above, the original destination of the first message may be placed in an outermost header that is not encrypted when the first message is sent to the second network 104 via the queue service 118.

At 718, the proxy service 116B or another process may retrieve the first message from the queue 716. The process that retrieves the first message may be executing in the second network 104, or otherwise be able to communicate with devices in the second network 104. At 720, the first message may be decrypted, in cases where the first message was encrypted prior to enqueuing. At 722, the first message may be deserialized.

At 724, the first message may be analyzed to determine the original destination specified for the first message at the first device. The original destination may be a URI that includes a hostname of the second device. In some embodiments, the original destination may be included in a header 502A with the first message, as described with reference to FIGS. 4 and 5. In such cases, the original destination may be extracted from the header 502A.

At 726, the first message may be modified to indicate the original destination, e.g., the second device, as the destination of the first message. For example, first message may be modified to replace the URI of the queue 716 with the URI of the second device. Such modification may proceed as described above with reference to FIG. 6.

At 728, the first message may be communicated to the second device in the second network 104.

With reference to FIG. 8, in some cases a service (e.g., the server process 112) may generate one or more second message(s) (e.g., the response(s) 202) in response to receiving the first message. For example, the first message may be a request 114 for data and the second message(s) may be response(s) 202 that include one or more of: the requested data, metadata describing the data, error message(s), or other information. At 802, the second message(s) may be accessed.

At 804, a queue for delivering the second message(s) may be determined. In some embodiments, this queue may be identified based on information included in the first message. For example, as described with reference to FIGS. 4 and 5, the first message may include a header 502B or other information specifying the response queue 204 to be used.

At 806, the second message(s) may be modified to indicate, as the destination of the second message(s), the queue determined at 804. Such modification may proceed similarly to the modification of the first message. For example, the second message(s) may be modified to replace the original destination (e.g., a URI including the first device) with a URI of the queue determined at 804. The original destination may be included in a header or otherwise conveyed with the second message(s).

At 808, the second message(s) may be serialized. At 810, in some embodiments the second message(s) may be encrypted. At 812, the second message(s) may be enqueued in the queue 814 determined at 804. Enqueuing the second message(s) may enable their delivery to the first device in the first network 102.

At 816, the second message(s) may be retrieved from the queue 814 by the proxy service 116A or another process. The retrieving process (e.g., the proxy service 116A) may operate within, or otherwise be able to communicate with, the first network 102.

At 818, the second message(s) may be decrypted, in cases where the second message(s) are encrypted prior to enqueuing. At 820, the second message(s) may be deserialized.

At 822, the second message(s) may be modified to indicate the original destination of the second message(s) as the destination. For example, the second message(s) may be modified to replace the URI of the queue 814 with the URI of the first device. At 824, the second message(s) may be communicated to the first device in the first network 102.

Figure 9:
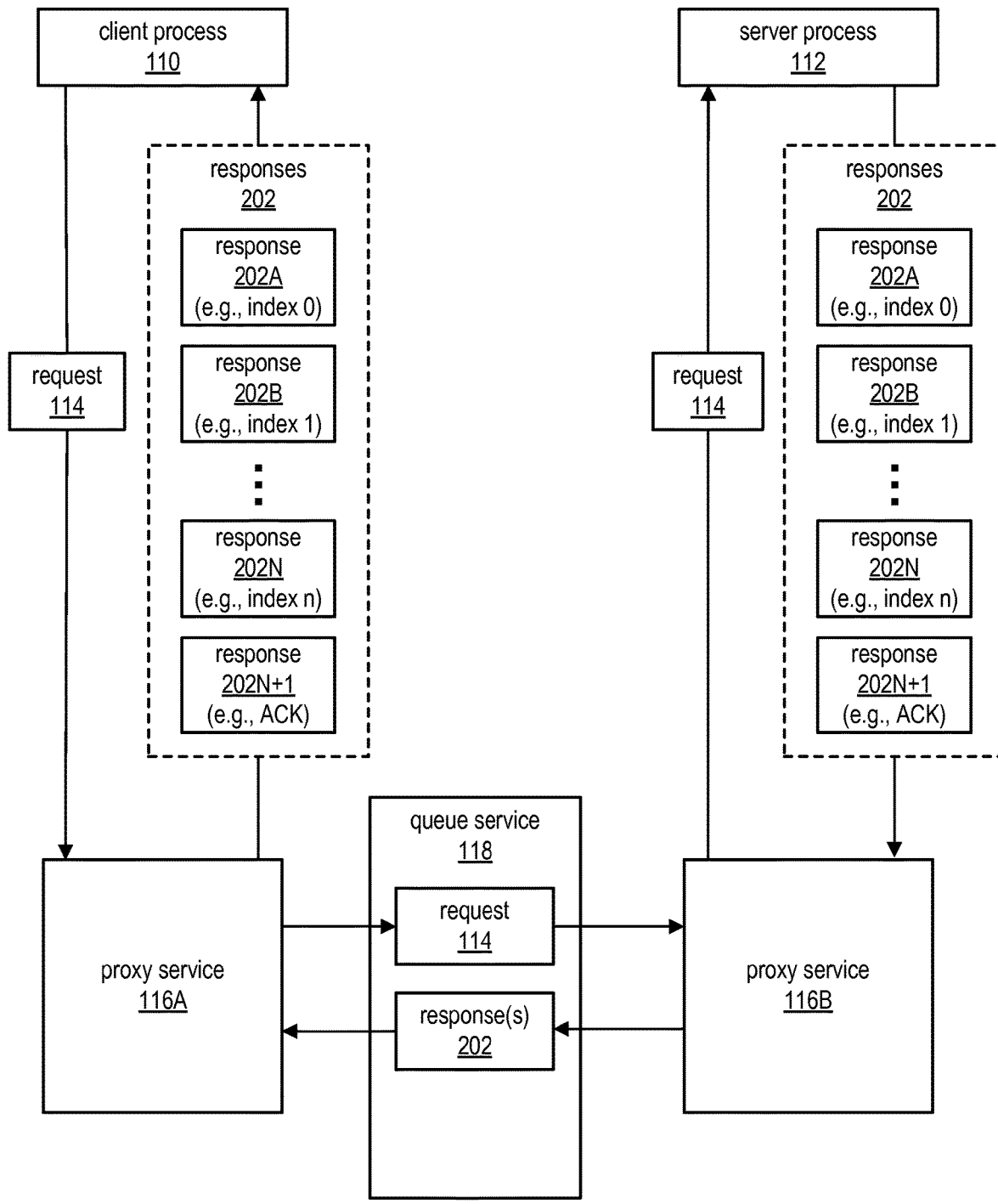
FIG. 9 is a block diagram illustrating one or more embodiments in which computing devices communicate via a queue service, using a communication protocol that supports multiple responses to a request.

Embodiments support the use of the queue service 118 to communicate messages between networks, where the messages are formatted according to a communication protocol in which a single response 202 is generated based on a request 114. Embodiments also support communication protocols in which multiple responses 202 may be generated in response to a request 114. FIG. 9 illustrates such embodiments. As shown in FIG. 9, a client process 110 may generate a request 114. As described above, the request 114 may be accessed by the proxy service 116A, which may enqueue the request 114 in a queue 716 maintained by the queue service 118. The request 114 may be retrieved from the queue 716 by a proxy service 116B and, after modifications, forwarded to a server process 112. The client process 110 and the server process 112 may execute on computing devices that are in separate networks, as described above.

On receiving the request 114, the server process 112 may generate a plurality of responses 202. In some embodiments, the responses 202 to the request 114 may include a request ID corresponding to the request 114. Each of the responses 202 may also include an index that indicates an order of the responses 202. The indices may be generated and included in the response(s) 202 by the server process 112. In some embodiments, the responses 202 may include an acknowledgement (ACK) response 202 that is the last response 202 sent by the server process 112. The ACK response 202 may indicate that no additional responses 202 are forthcoming. The responses 202 may be accessed by the proxy service 116B and, after being modified as described above, enqueued in one or more queues 814 maintained by the queue service 118. In some cases, each of the responses 202 may be enqueued as a separate message in a queue 814. Alternatively, two or more responses 202 may be enqueued in a same message in the queue 814.

The proxy service 116A may retrieve the responses 202 from the queue 814 and, after modifications as described above, forward the responses 202 to the client process 110. In some cases, the responses 202 may be received by the proxy service 116B, enqueued in the queue 814, retrieved by the proxy service 116A, or sent to the client process 110 in an order other than the order in which the responses 202 were originally generated and sent by the server process 112. In such cases, the client process 110 may employ the indices of the responses 202 to determine the order in which the responses 202 are to be processed. In some embodiments, the client process 110 may employ the ACK response 202 to determine that the complete set of responses 202 has been received, and that no further responses 202 are forthcoming.

In some cases, the request 114 may include a response ID that (e.g., uniquely) identifies the particular request 114, and the response(s) 202 may also include the response ID to ensure that the response(s) 202 are correctly associated with the request 114 by the client process 110. In some embodiments, the request 114 may include a header 502 that includes the response ID. In some embodiments, the ACK response 202N+1 may be omitted from the set of response(s) 202 sent by the server process 112 in response to the request 114. In such cases, the client process 110 may wait for a predetermined period of time since the most recently received response 202 and timeout of the elapsed time is longer than the predetermined timeout period.

Figure 10:
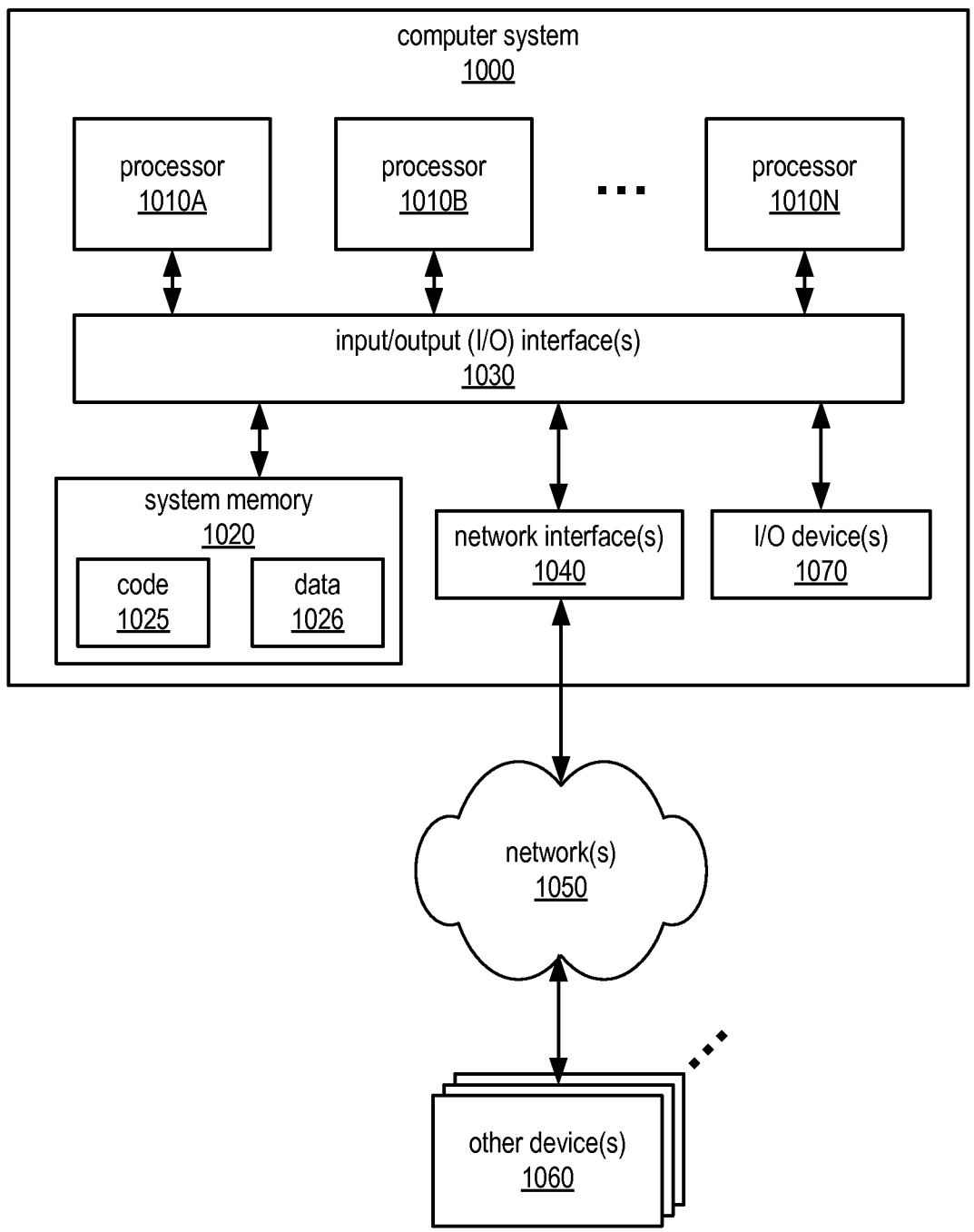
FIG. 10 is a block diagram illustrating a computer system configured to implement one or more embodiments for facilitating communications using a queue service.

FIG. 10 is a block diagram illustrating a computer system 1000 configured to implement at least a portion of the queue-based communication described herein according to various embodiments. The computer system 1000 may include any number of computing devices, and may execute or otherwise include any number of software modules such as applications, processes, libraries, interfaces, application programming interfaces (APIs), and so forth. For example, computer system 1000 may be configured to implement one or more of the client device 106, the server device 108, the proxy device 124A, the proxy device 124B, or the queue server device(s) 122. The computer system 1000 may include any type of computing device including but not limited to: a personal computer system, a desktop computer, a rack-mounted computing device, a laptop or notebook computer, a tablet computer, an electronic book (e-book) reader, a wearable computer, an implanted computer, a mainframe computer system, a distributed computing device (e.g., cloud server), a handheld computer, a workstation, a network computer, a consumer device, an automotive computer, a home entertainment device, a smart appliance, a storage device, a telephone, a remote control, a game controller, a gaming system, a mobile telephone, a smartphone, or any other type of computing device.

The computing system 1000 may include one or more physical computing devices. The computing system 1000 may also include one or more of a virtual computing environment, a hypervisor, an emulation, or a virtual machine executing on one or more physical computing devices. In some embodiments, the computing system 1000 may comprise a cluster, cloud, farm, or other grouping of multiple devices that coordinate operations to provide load balancing, failover support, parallel processing capabilities, shared storage resources, or other aspects.

Computer system 1000 may include one or more processors 1010 coupled to a system memory 1020 via one or more input/output (I/O) interfaces 1030. One or more of the processor(s) 1010 may include a single core or multiple cores, which may be configured to execute single-threaded or multi-threaded code. In various embodiments, computer system 1000 may be a uniprocessor system including one processor 1010, or a multiprocessor system including multiple processors 1010 (e.g., two, four, eight, or any other number). The processor(s) 1010 may include any processor(s) capable of executing instructions. For example, in various embodiments, the processor(s) 1010 may include general-purpose or embedded processor(s) implementing any of a variety of instruction set architectures (ISAs), such as the x86, PowerPC, SPARC, or MIPS ISAs, or any other ISA. In multiprocessor systems, each of processors 1010 may implement the same ISA. Alternatively, different ones of the processors 1010 may implement different ISAs.

The computer system 1000 may include one or more system memories 1020, described herein as system memory 1020, configured to store one or more of code 1025 or data 1026 such that the code 1025 and the data 1026 are accessible by the processor(s) 1010. The system memory 1020 may comprise one or more computer-readable storage media that include one or more of the following: an electronic storage medium, a magnetic storage medium, an optical storage medium, a quantum storage medium, a mechanical computer storage medium, a solid state storage medium, and so forth. The system memory 1020 may be implemented using any memory technology, including but not limited to one or more of the following: read-only memory (ROM), random access memory (RAM), static RAM (SRAM), dynamic RAM (DRAM), Rambus DRAM (RDRAM), extended data out (EDO) RAM, synchronous DRAM (SDRAM), double data rate SDRAM (DDR SDRAM), electrically erasable programmable ROM (EEPROM), flash memory, non-volatile memory, volatile memory, or any other type of memory. The system memory 1020 may be incorporated into the computer system 1000. In some cases, at least a portion of the system memory 1020 may be external to the computer system 1000 and accessible via the network interface(s) 1040 or the I/O device(s) 1070.

The system memory 1020 may include the code 1025. The code 1025 may include executable instructions that are executable by processor(s) 1010 to implement the embodiments described herein. The code 1025 may implement one or more executable software modules, such as applications, programs, processes, libraries, interfaces, APIs, scripts, routines, and so forth. The code 1025 may be in a compressed or uncompressed form. The code 1025 may be in an encrypted or unencrypted form. The code 1025 may include any number of instructions that may be employed to program a computing device, or other electronic device, to perform the operations described herein. The code 1025 may be arranged in any format and according to any language. In some embodiments, the code 1025 may include machine-executable binary instructions that are configured to execute on the processor(s) 1010, the instructions generated by compiling, linking, or otherwise processing source code written in any programming language. In some embodiments, the code 1025 may include intermediate language instructions (e.g., bytecodes) that execute within a runtime application such as a Java™ Virtual Machine (JVM), C #™ runtime, or any other runtime, interpreter, virtual machine, or execution engine running on the computer system 1000. In some embodiments, the code 1025 may include instructions written in a scripting language or interpreted language, such as JavaScript™, ActiveScript™, VBScript™, Perl™, and so forth. In such cases, the code 1025 may execute within a runtime, interpreter, virtual machine, scripting engine, or other process that executes on the computer system 1000.

The code 1025 may include instructions to implement one or more of the client process 110, the server process 112, the proxy service 116A, the proxy service 116B, or the queue service 118. The code 1025 may also include instructions to implement at least one operating system (OS) that executes on the computer system 1000. The at least one OS may include one or more of the following: any version of the UNIX™ OS; any version of the Linux™ OS; any version of iOS™ or OSX™ from Apple Corp. of Cupertino, Calif., USA; any version of Windows™ or Windows Mobile™ from Microsoft Corp. of Redmond, Wash., USA; any version of Android™ from Google Corp. of Mountain View, Calif., USA and its derivatives from various sources; any version of Palm OS™ from Palm Computing, Inc. of Sunnyvale, Calif., USA and its derivatives from various sources; any version of BlackBerry OS™ from Research In Motion Ltd. of Waterloo, Ontario, Canada; any version of VxWorks™ from Wind River Systems of Alameda, Calif., USA; or other operating systems.

The system memory 1020 may include data 1026 employed during operations of the computer system 1000. The data 1026 may include one or more of the following: the request 114, the request queue(s) 120, the response(s) 202, the response queue(s) 204, the routing map 312, the queue(s) 716, or the queue(s) 814. The data 1026 may be stored in any format. In some embodiments, at least a portion of the data 1026 may be stored externally to the computer system 1000, on one or more other devices or storage media that may communicate with the computer system 1000 via the network interface(s) 1040, the I/O interface(s) 1030, or the I/O device(s) 1070. The system memory 1020 may include persistent storage such as one or more hard drives, tape drives, solid state memory, other mass storage devices, or any other persistent storage device. The system memory 1020 may also include active memory, physical memory, or virtual memory that is employed by processes executing on the computer system 1000. The system memory 1020 may include cache memory.

The system memory 1020 may comprise one or more non-transitory storage media that store information such as one or both of the code 1025 or the data 1026. Non-transitory storage media may store information in any arrangement, and using any storage technology, such that the stored information is computer-readable, i.e., readable by a machine such as a computing device. Non-transitory storage media may include any media that is configured to store information such that the stored information persists for at least a minimum duration relative to the operations described herein. Non-transitory storage media may include any media that is transportable as a physical object. Embodiments may include software comprising one or both of the code 1025 or the data 1026 stored on the system memory 1020 that comprises one or more non-transitory storage media. Such software may be used to program the computer system 1000, or other electronic devices, to perform one or more operations according to various embodiments.

Embodiments may also include software that is transmitted in a transitory form as an electromagnetic transmission, optical transmission, acoustical transmission, or any other type of signal or communication. Such software may be communicated using any communication protocol over the Internet or any other communications network, using a wired or wireless communication path. In such cases, the software may be received using the network interface(s) 1040 and employed to program the computer system 1000, or other electronic devices, to perform one or more operations according to various embodiments.

The I/O interface(s) 1030 may be configured to coordinate I/O traffic between the processor(s) 1010, the system memory 1020, and any peripheral devices accessible to the computer system 1000 through the network interface(s) 1040 or other peripheral interface(s). In some embodiments, the I/O interface(s) 1030 may perform protocol, timing or other data transformations to convert data from one component (e.g., the system memory 1020) into a format suitable for use by another component (e.g., the processor(s) 1010). In some embodiments, the I/O interface(s) 1030 may include support for devices attached through various types of peripheral buses that support any bus standard such as any variant of the Peripheral Component Interconnect (PCI) bus standard or the Universal Serial Bus (USB) standard. In some embodiments, the function of I/O interface(s) 1030 may be split into two or more separate components, such as a north bridge and a south bridge. Moreover, in some embodiments at least some of the functionality of I/O interface(s) 1030, such as an interface to the system memory 1020, may be incorporated directly into the processor(s) 1010.

The computer system 1000 may include one or more network interfaces 1040 coupled to the I/O interface(s) 1030. The one or more network interfaces 1040 may be employed by the various components or software of the computer system 1000 to communicate with other systems and/or components over one or more communications networks 1050. The network interface(s) 1040 may include one or more network interface controllers (NICs), transceiver devices, or other types of network communications devices configured to send and receive communications over the network(s) 1050.

The computer system 1000 may employ the network interface(s) 1040 to communicate and exchange data with one or more other devices 1060 over the network(s) 1050. The network interface(s) 1040 may support one or more wireless networking protocols such as any version of the Institute of Electrical and Electronics Engineers (IEEE) 802.11 standard or other wireless networking standard. The network interface(s) 1040 may also support communication via any wired data networks, such as Ethernet networks. The network interface(s) 1040 may also support communication via any telecommunications or telephony network such as analog voice networks or digital fiber communications networks, via storage area networks such as Fibre Channel storage area networks (SANs), or via any other suitable type of network and/or protocol.

In some embodiments, the network interface(s) 1040 may be configured to enable communication between the computer system 1000 and one or more I/O devices 1070, or between the computer system 1000 and external (e.g., remote) storage device(s). The I/O device(s) 1070 may include one or more data input devices such as a keyboard, a keypad, a mouse, a pen, a game controller, a touch input device, an audio input device (e.g., a microphone), a gestural input device, a haptic input device, an image or video capture device (e.g., a camera), or other data input devices. In some cases, the I/O device(s) 1070 may include one or more data output devices such as a display, an audio output device (e.g., a speaker), a printer, a haptic output device, and so forth.

The I/O device(s) 1070 may be components of all the devices included in the computer system 1000 or may be components of different devices that comprise the computer system 1000. The I/O device(s) 1070 may be physically incorporated with the computer system 1000. In some embodiments, one or more of the I/O device(s) 1070 may be externally placed relative to the computer system 1000 and may communicate with the computer system 1000 using a wired or wireless connection, such as over the network interface(s) 1040. In various embodiments, the computer system 1000 may include more, fewer, or different components than those illustrated in FIG. 10.

The network(s) 1050 may include public networks such as the Internet, private networks such as an institutional or personal intranet, or some combination of private and public networks. The network(s) 1050 may include any type of wired or wireless network, including but not limited to local area networks (LANs), wide area networks (WANs), wireless WANs (WWANs), wireless LANs (WLANs), mobile communications networks (e.g., 3G, 4G, etc.), and so forth. The various computing systems, devices, and processes described herein may employ the network(s) 1050 for communication. Such communications may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol. The network(s) 1050 may include the first network 102 and the second network 104.

The various methods, processes, and routines illustrated in the figures and described herein represent example embodiments. The methods may be implemented as software, as hardware, as manual operations, or as any combination thereof. The order of operations performed by any method, process, or routine described herein may be changed, and one or more operations may be added, reordered, combined, omitted, or modified. The operations may be performed serially or in parallel. In cases where the methods, process, and routines described herein are implemented as computer programs, any number of instances of these programs may be executed on any number of separate computer systems or on the same computer system. Although certain operations may be described herein as performed by particular devices, software programs, processes, or entities, embodiments are not limited to these examples. A variety of alternative embodiments will be understood by those having ordinary skill in the art.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
one or more computing devices configured to implement a first proxy service and a second proxy service, wherein the first proxy service is configured to:
access a request generated by a first device in a first network, wherein the request is arranged according to an application layer protocol, wherein the request initially indicates a second device as a destination of the request, and wherein the second device is in a second network that is separate from the first network such that the first device is unable to communicate the request directly to the second device;
modify the request to change the destination of the request from indicating the second device to indicating a request queue, wherein the request queue is different than the second device, wherein the request queue corresponds to the second network, and wherein the request queue is provided by a queue service that is accessible from the first network and the separate second network;
serialize the request; and
enqueue the request in the request queue indicated as the destination of the request for communication to the second device in the separate second network; and
wherein the second proxy service is configured to:
retrieve the request from the request queue that corresponds to the second network;
deserialize the request;
modify the request to indicate the second device as the destination of the request; and
communicate the request to the second device in the second network using the application layer protocol.

2. The system of claim 1, wherein:
the second proxy service is further configured to:
access at least one response generated by the second device in response to the request;
modify the at least one response to indicate a response queue as a destination of the at least one response, the response queue corresponding to the first proxy service;
serialize the at least one response; and
enqueue the at least one response in the response queue; and
the first proxy service is further configured to:
retrieve the at least one response from the response queue;
deserialize the at least one response;
modify the at least one response to indicate the first device as the destination of the at least one response; and
communicate the at least one response to the first device in the first network using the application layer protocol.

3. The system of claim 2, wherein:
the first proxy service is further configured to modify the request by including, in the request, a header that identifies the response queue corresponding to the first proxy service; and
the second proxy service is further configured to determine, based on the header, the response queue in which to enqueue the at least one response.

4. The system of claim 1, wherein:
the first proxy service comprises a serialization module that serializes the request according to the application layer protocol prior to enqueuing the request; and
the second proxy service comprises a deserialization module that deserializes the request according to the application layer protocol after retrieving the request from the request queue.

5. The system of claim 1, wherein:
the request is generated by the first device to include a first uniform resource locator (URL) that specifies a domain name of the second device as the destination of the request; and
the first proxy service, to modify the request, is further configured to:
include, in the request, a header comprising the domain name of the second device; and
modify the request to include a second URL indicating the request queue as the destination of the request.

6. A computer-implemented method, comprising:
accessing a request generated by a first device in a first network, the request initially indicating, as a destination of the request, a second device in a second network, wherein the second network is separate from the first network such that the first device is unable to communicate the request directly to the second device;
modifying the request to change the destination of the request from indicating the second device to indicating a request queue, wherein the request queue is different than the second device, and wherein the request queue is accessible from the first network and the separate second network;
serializing the request; and
enqueuing the request in the request queue, indicated as the destination of the request, for communication to the second device in the separate second network, the enqueuing enabling a remote proxy service operating in the second network to:
retrieve the request from the request queue;
deserialize the request; and
communicate the request to the second device in the second network.

7. The method of claim 6, wherein:
the request is arranged according to an application layer protocol; and
the serializing of the request is based at least partly on the application layer protocol.

8. The method of claim 6, wherein the request is arranged according to a version of HyperText Transfer Protocol (HTTP).

9. The method of claim 6, wherein the request is serialized at least partly according to a version of JavaScript Object Notation (JSON).

10. The method of claim 6, wherein:
the first network includes a first plurality of computing devices in a first region; and
the second network includes a second plurality of computing devices in a second region.

11. The method of claim 6, further comprising:
retrieving, from a response queue, at least one response generated at the second device in response to the request, the at least one response having been serialized and enqueued in the response queue by the remote proxy service;
deserializing the at least one response; and
communicating the at least one response to the first device.

12. The method of claim 11, further comprising:
modifying the request to include information identifying the response queue in which the at least one response is to be enqueued by the remote proxy service.

13. The method of claim 6, further comprising:
encrypting the request prior to enqueuing the request in the request queue.

14. The method of claim 6, further comprising:
determining a region in which the second device is located, based at least partly on a routing map that lists the region associated with individual ones of a plurality of computing devices; and
determining the request queue corresponding to the second network that connects the plurality of computing devices located in the region.

15. One or more non-transitory computer-readable media storing instructions which, when executed on one or more processors, cause the one or more processors to perform operations comprising:
accessing a message generated by a first device in a first network, the message initially indicating, as a destination of the message, a second device in a second network, wherein the second network is separate from the first network such that the first device is unable to communicate the message directly to the second device;
modifying the message to change the destination of the message from indicating the second device to indicating a queue, wherein the queue is different than the second device, and wherein the queue is accessible from the first network and the separate second network; and
enqueuing the message in the queue indicated as the destination of the message for communication to the second device in the separate second network.

16. The one or more non-transitory computer-readable media of claim 15, wherein:
the message is formatted according to an application level protocol; and
the operations further comprise serializing the message prior to enqueuing the message, the serializing based at least partly on the application level protocol.

17. The one or more non-transitory computer-readable media of claim 15, the operations further comprising:
encrypting the message prior to enqueuing the message.

18. The one or more non-transitory computer-readable media of claim 15, wherein modifying the message further comprises:
including, in the message, information identifying the second device as a final destination of the message.

19. The one or more non-transitory computer-readable media of claim 15, wherein:
the message is a first message;
the queue is a first queue; and
the operations further comprise:
retrieving at least one second message from a second queue, the at least one second message at least partly generated at the second device in response to the first message; and
communicating the at least one second message to the first device.

20. The one or more non-transitory computer-readable media of claim 19, wherein modifying the message further comprises:
including, in the message, information indicating the second queue in which the at least one second message is to be enqueued.

\* \* \* \* \*